United States Patent
Ghorbel et al.

(10) Patent No.: US 7,182,025 B2
(45) Date of Patent: Feb. 27, 2007

(54) AUTONOMOUS ROBOTIC CRAWLER FOR IN-PIPE INSPECTION

(75) Inventors: Fathi Hassan Ghorbel, Houston, TX (US); James Bruster Dabney, Houston, TX (US)

(73) Assignees: William Marsh Rice University, Houston, TX (US); University of Houston Clear Lake, Houston, TX (US)

( * ) Notice: Subject to any disclaimer, the term of this patent is extended or adjusted under 35 U.S.C. 154(b) by 0 days.

(21) Appl. No.: 10/730,233

(22) Filed: Dec. 8, 2003

(65) Prior Publication Data

US 2004/0173116 A1 Sep. 9, 2004

Related U.S. Application Data

(63) Continuation-in-part of application No. 10/272,846, filed on Oct. 17, 2002.

(60) Provisional application No. 60/329,862, filed on Oct. 17, 2001.

(51) Int. Cl.
*B61F 13/00* (2006.01)
(52) U.S. Cl. .................................. 104/139
(58) Field of Classification Search ........... 104/138.1, 104/138.2, 139
See application file for complete search history.

(56) References Cited

U.S. PATENT DOCUMENTS

| | | | |
|---|---|---|---|
| 3,890,905 A | 6/1975 | Clavin | |
| 4,000,655 A | 1/1977 | Jones | |
| 4,055,315 A | 10/1977 | Gvelesiani et al. | |
| 4,170,902 A | 10/1979 | Pallan | |
| 4,537,136 A | 8/1985 | Douglas | |
| 4,603,720 A | 8/1986 | Jacoby | |
| 4,636,137 A | 1/1987 | Lemelson | |
| 4,677,865 A | 7/1987 | Lehmann | |
| 4,862,808 A | 9/1989 | Hedgcoxe et al. | |
| 5,172,639 A | 12/1992 | Wiesman et al. | |
| 5,392,715 A | 2/1995 | Pelrine | |
| 5,551,349 A | 9/1996 | Bodzin | |
| 5,565,633 A | 10/1996 | Wernicke | |
| 5,571,977 A | 11/1996 | Kipp | |
| 5,649,603 A * | 7/1997 | Simpson et al. ............ 175/323 |
| 5,749,397 A * | 5/1998 | Molaug ........................ 138/89 |
| 5,773,984 A | 6/1998 | Suyama et al. | |
| 5,878,783 A | 3/1999 | Smart | |
| 6,019,048 A | 2/2000 | Seeberger et al. | |
| 6,031,371 A | 2/2000 | Smart | |
| 6,035,786 A * | 3/2000 | McKay et al. ........... 104/138.1 |
| 6,087,830 A | 7/2000 | Brandly et al. | |
| 6,107,795 A | 8/2000 | Smart | |

(Continued)

*Primary Examiner*—S. Joseph Morano
*Assistant Examiner*—Robert J. McCarry, Jr.
(74) *Attorney, Agent, or Firm*—Conley Rose, P.C.

(57) ABSTRACT

The specification discloses a robot for inspection adapted to travel virtually unlimited distances through small-diameter enclosed spaces such as conduits or ducts, preferably using a fluid-driven screw-drive propulsion system. The robot preferably includes a plurality of wheels inclined at an angle greater than zero degrees and less than ninety degrees to the longitudinal axis of the pipe, a plurality of wheels aligned parallel to the longitudinal axis of the pipe, and a power system for causing relative rotation of the sections bearing the pitched and non-pitched wheels. The robot may include internal fluid flow passages, notched wheels, multiple retractable wheels, and is configured so as to have an operating diameter less than six and preferably less than two inches.

25 Claims, 5 Drawing Sheets

U.S. PATENT DOCUMENTS

| | | |
|---|---|---|
| 6,123,027 A | 9/2000 | Suyama et al. |
| 6,162,171 A * | 12/2000 | Ng et al. ............... 600/141 |
| 6,243,657 B1 | 6/2001 | Tuck et al. |
| 6,339,993 B1 * | 1/2002 | Comello et al. ......... 104/138.2 |
| 6,427,602 B1 | 8/2002 | Hovis et al. |
| 6,450,104 B1 | 9/2002 | Grant et al. |

* cited by examiner

AUTONOMOUS ROBOTIC CRAWLER FOR IN-PIPE INSPECTION

CROSS-REFERENCE TO RELATED APPLICATIONS

This application is a continuation-in-part of U.S. patent application Ser. No. 10/272,846, filed Oct. 17, 2002, which claims the benefit of U.S. provisional patent application Ser. No. 60/329,862, filed Oct. 17, 2001, both of which are incorporated herein by reference in their entireties.

STATEMENT REGUARDING FEDERALLY SPONSORED RESEARCH OR DEVELOPMENT

Not Applicable.

BACKGROUND OF THE INVENTION

1. Field of the Invention

The present invention generally relates to a robotic apparatus and, more particularly, to a robotic apparatus adapted to travel through enclosed spaces such as conduits or ducts using mechanically enabled helical-like motions.

2. Background of Relevant Art

Pipe crawlers, pipe inspection pigs and similar vehicles are widely used for inspecting the interior surfaces of piping systems, storage tanks, and process vessels for damaged or flawed structural features. Typically, such devices include a testing probe, sensor, or camera carried by a support structure that travels through the piping system being inspected.

Many of the remote inspection devices have been designed for pipes having a six-inch or greater inner diameter. However, there remains a need for the inspection of smaller diameter pipes, such as coiled steel tubing. In particular, there is a need for small-diameter inspection devices that are capable of travelling very long distances. For example, coiled steel tubing is often produced with lengths of 7,620 m (25,000 ft) at 32 mm (1.25 in) diameter or 1,800 m (6,000 ft) at 90 mm (3.5 in) diameter. Lengths of coiled tubing are stored on reels with diameters from 2 ft to 20 ft.

While current advances in miniaturization technology have made cameras and sensors small enough to fit within a small diameter pipe, there have been few advances in the design of a crawling apparatus having adequate motive forces to deploy a small diameter inspection apparatus through an extensive pipe system. For example, miniature electric motors do not provide enough motive force to pull extensive length tethers behind the crawler. Similarly, miniature air cylinders do not have the capacity to generate enough pushing force directly against the inner-walled pipe as is required for inch-worm motion. In addition, neither technology is capable of propelling an inspection devices of the mile-plus distances that may be required.

The art teaches a variety of larger-diameter pipe inspection apparatuses. One such apparatus is taught in U.S. Pat. No. 4,006,359 to Sullins et al. The crawler of Sullins et al. is a completely self-contained, self-propelled and self-operated vehicle adapted to travel through a pipeline, stop at particular locations such as a girth weld between adjoining sections of pipe, inspect the weld, for example by X-raying it and then proceed onto the next location to be inspected. While suitable for use in large diameter pipelines and traveling short distances, the crawler of Sullins et al. would not be feasible for use in coiled tubing for the following reasons. First, Sullins et al's crawler includes x-ray equipment (e.g. x-ray tube), which has not yet been fabricated to fit in small pipe diameters. Secondly, because x-ray equipment requires a large amount of power to operate, the size of the power source is dependent on the x-ray equipment, and thus greatly increased. Therefore, in addition to the x-ray equipment, the size of the power source may prohibit the crawler from traveling in small diameter spaces for long distances.

Another such apparatus is taught in U.S. Pat. No. 5,392,715 to Pelrine. Pelrine teaches an in-pipe running robot which does not easily turn over even when running round circumferentially inside piping. Still another such apparatus is taught in U.S. Pat. No. 4,862,808 to Hedgcoxe et al. Hedgcoxe et al. describes a robotic pipe crawling device having module pivot flexibility, which enables the device to negotiate corners with complete autonomy. However, there are limitations to the size and motive force capable of being exerted by these prior art devices as set forth above.

In particular, there is a need for a pipe inspection apparatus that will provide the necessary motive force for small diameter pipes. The apparatus should be dimensioned to pass through various sizes of piping and be able to readily negotiate bends in the piping. In addition, the pipe crawler should be autonomous and able to generate a sufficient motive force that can propel inspection equipment. Also, the pipe crawler should be capable of traveling in forward and backward directions, accelerating, decelerating, and stopping.

Thus, what is needed is a robotic apparatus that overcomes the deficiencies of the currently available technologies.

BRIEF SUMMARY OF THE INVENTION

The present invention overcomes the deficiencies of the prior art by providing a robotic apparatus adapted to travel through enclosed spaces such as conduits or ducts using a mechanical propulsion system.

In a preferred embodiment of the present invention, a robot for in-pipe inspection includes a drive module having a plurality of wheels inclined at an angle greater than zero degrees and less than ninety degrees to the longitudinal axis of the pipe, a driver module having a plurality of wheels aligned parallel to the longitudinal axis of the pipe, and a power source. The driver module is preferably connected to the drive module such that the drive and driver modules cooperate to move the robot through the pipe or conduit. Various sources of power can be used with the present device. Particularly preferred is a turbine system that allows the device to be powered by the a flow of fluid, such as air, through the pipe or conduit.

The present device is capable of operating in a autonomous mode, wherein it derives power from the flow of fluid through the conduit and is capable of propelling itself in either the same or opposite direction as the fluid flow and at a speed that may vary from the fluid velocity, and a passive mode, in which the drive mechanism is inactivated and the device is carried by the fluid flow itself.

BRIEF DESCRIPTION OF THE DRAWINGS

For a more detailed description of the preferred embodiment of the present invention, reference will now be made to the accompanying drawings, wherein.

DETAILED DESCRIPTION OF THE PREFERRED EMBODIMENTS

In order to fully describe the embodiments of the present invention, reference will be made throughout this description to a longitudinal axis. The longitudinal axis is parallel to the axis of symmetry of the conduit or pipe through which the robot is traveling. It should be appreciated that the scope of the invention is only limited by the claims and not by this description.

Figure 1:
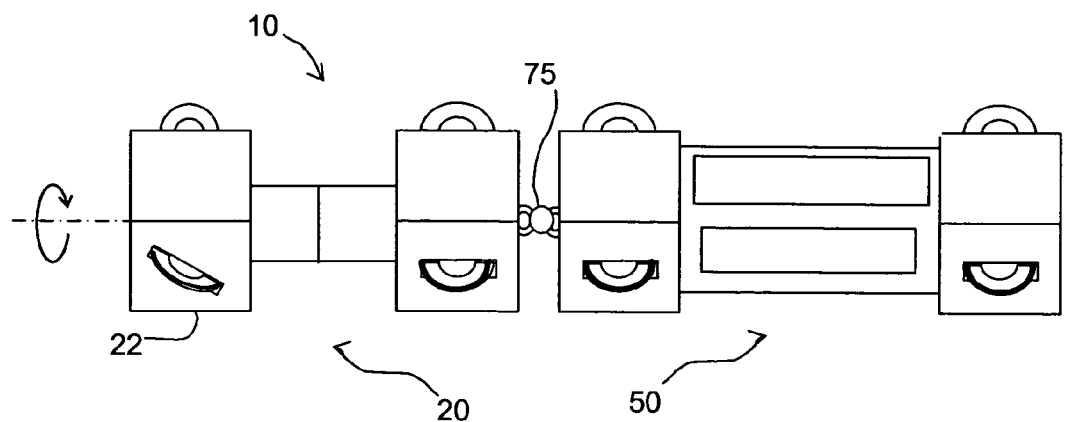
FIG. 1 is a schematic side view of a pipe-crawling robot in accordance with an embodiment of the present invention.
Figure 2:
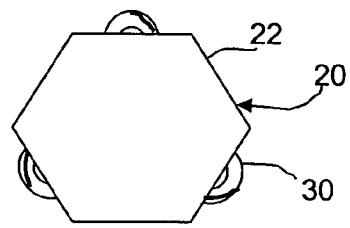
FIG. 2 is an end view of the device shown in FIG. 1.

Referring initially to FIGS. 1 and 2, the present invention provides a pipe-crawling robot 10. Robot 10 generally consists of at least two independently modular, articulated segments: first segment 20 and second segment 50. First segment 20 is preferably connected to second segment 50 by a flexible coupling 75. Flexible coupling 75 is free to bend about the longitudinal axis of robot 10, but prevents the relative rotation about the longitudinal axis. The combination of first segment 20 and second segment 50 provide the locomotive motion of robot 10, as will be described below in detail.

Figure 3:
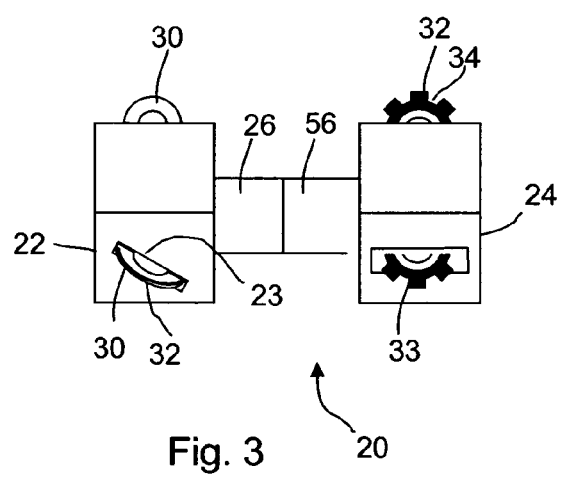
FIG. 3 is a schematic side view of a first segment of the robot shown in FIG. 1.

Referring now to FIG. 3, a more detailed depiction of first segment 20 is shown. First segment 20 preferably includes two end sections 22, 24, and a motor 56 disposed between end sections 22 and 24. End segment 22 can be characterized as a drive module and end segment 24 can be characterized as a driver module. End sections 22, 24 may house components such as sensor and tool components (not shown). In a preferred embodiment, a shaft 26 couples motor 56 to end section 24. Motor 56 is preferably an electric motor, such as a DC servomotor. In a preferred embodiment, shaft 26 engages end section 22 such that when power is supplied to motor 56, motor 56 causes relative rotation between end sections 22 and 24.

In addition to housing components, at least one of end sections 22 and 24 serves as a platform for a plurality of pitched wheels 30 and non-pitched wheels 33, which are each supported on a suspension systems (not shown). The wheels preferably include polymeric tires 32 and preferably include ball-bearing hubs (not shown). In a preferred embodiment, the tires 32 on one or more wheels or sets of wheels may each include a plurality of notches 34 in their traction surfaces, as shown on end section 24 in FIG. 3. While FIG. 3 shows notched tires on nonpitched wheels 33, in alternative embodiments pitched wheels 30 or all wheels are provided with non-pitched wheels. It will be understood that notches 34 can be replaced with teeth, grooves, ridges, bosses, indentations or the like. These surface features enable tires 32 to traverse small surface features on the pipe wall, such as welds, more easily than would a circular traction surface.

As shown in the embodiment of FIG. 3, the wheels 33 on end section 24 are preferably non-pitched. Pitched wheels 30 are preferably inclined at an angle greater than zero degrees and less than ninety degrees with respect to the longitudinal axis. The pitch of the wheels may be adjusted so that robot 10 travels at an acceptable speed, dependent on the environment of the conduit it is traveling in. For example, in smooth regions within the conduit, the pitch of the wheels 30 is preferably decreased so that robot 10 travels at a faster pace. Alternatively, in rough regions within the conduit, the pitch of the wheels 30 may be increased so that robot 10 travels at a slower pace. While the embodiment shown and described herein includes pitched wheels on its front segment and non-pitched wheels on trailing segments, it will be understood that pitched wheels could be used on one or more segments without departing from the scope of the invention.

Figure 12:
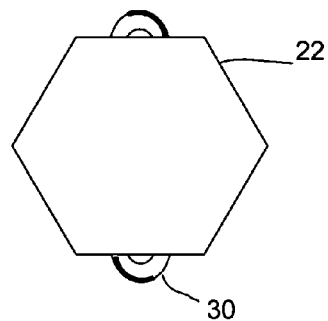
FIGS. 12 and 13 are end and side views of another alternative embodiment of the present invention, respectively.
Figure 13:
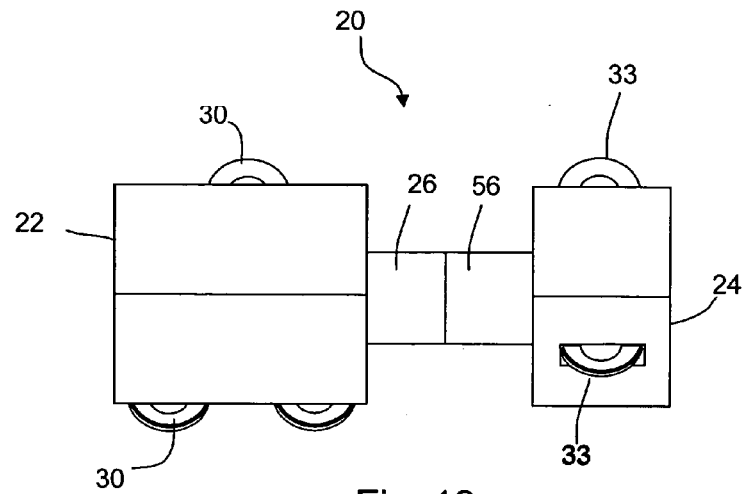
Figure 14:
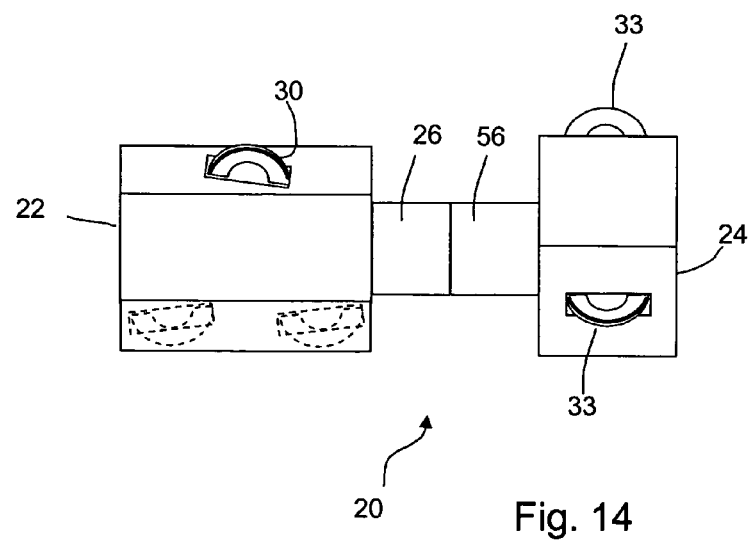
FIG. 14 is a side view of the same embodiment as FIGS. 12 and 13, with the end section rotated by 30 degrees.

In addition to pitch, the axial and azimuthal placement and number of pitched wheels 30 may also be varied. In one preferred embodiment, end sections 22, 24 each include three wheels 30 located 120° apart from each other. In the embodiment shown in FIGS. 1 and 3, pitched wheels 30 are 120° apart and lie at substantially the same position along the axial length of the tool. Alternatively, as illustrated in FIGS. 8–11, pitched wheels 30 may be spaced along the length of the tool, resulting in at least one helical row of wheels 30 around first segment 20. In another alternative embodiment, illustrated in FIGS. 12–14, pitched wheels 30 are again spaced along the length of the tool, but instead of being 120° apart, they are 180° apart, so that the first and third wheels share an azimuthal position with respect to the tool. It is preferred but not necessary that the pitch of the helix defined by the position of the wheels in a given set be sufficiently great to allow each wheel to retract and/or disengage without interfering with the retraction or disengagement of adjacent wheels.

Referring again to FIG. 3, the suspension systems are preferably spring-loaded cartridges 38, which are affixed in recesses in end sections 22, 24. In an alternate embodiment, the suspension systems are cam-driven cartridges (not shown). The cams are preferably double-sided cams, which act against a follower mounted to each wheel support. A potential benefit of using cam-driven cartridges is that cam-driven cartridges may allow for longer travel and smaller friction force variation than spring-loaded cartridges. In any event, it is preferred but not necessary that the support system for each wheel provide sufficient play to allow the robot to traverse weld joints, surface corrosion or other surface features that may reasonably be expected on the inside pipe surface.

In a preferred embodiment, at least one of pitched wheels 30 is capable of being dynamically engaged and disengaged. Disengagement can occur either in response to a signal from outside the tool or in response to a sensed event. Examples of events that may trigger disengagement of at least one wheel, all wheels in a set, or all wheels, include but are not limited to power failure and an encounter by the tool of a constriction or impasse in the pipe or conduit. If the robot gets stuck, one or more of the wheels may selectively be retracted. When pitched wheels 30 are disengaged, for example, the motor is typically turned off, since rotation of end section 22 will not advance the device within the conduit. With selected pitched or non-pitched wheels retracted, or with motor 56 disengaged so that shaft 26 can rotate freely, robot 10 becomes to a passive device that can be propelled through the conduit by the flow of gas or liquid in the conduit.

It is preferred but not necessary that the retraction distance of a wheel upon disengagement be equal to at least one-third and more preferably one-half the diameter of the wheel. Alternatively, it is preferred that the diameter of the robot be decreased by at least 10 percent and more preferably at least 20 percent upon wheel retraction.

In an alternate embodiment, paddles or sails (not shown) may be used in combination with or in place of drive wheels 30. When employing paddles or sails, air or liquid may be used to propel robot 10.

Figure 4:
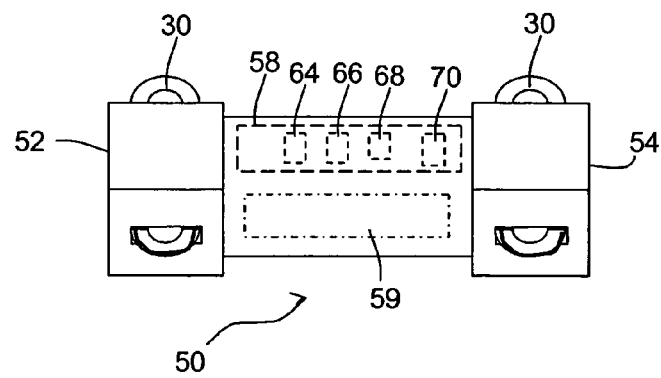
FIG. 4 is a schematic side view of a second segment of the robot shown in FIG. 1.

Referring now to FIG. 4, a more detailed depiction of second segment 50 is shown. Second segment 50 preferably includes end sections 52, 54, integrated circuit 58, and battery 59. Wiring/cables for sending information and/or power between components of robot 10 are preferably internal. For example, battery 59 provides electrical power to motor 56 (FIG. 1).

Integrated circuit 58 preferably includes a master control unit 64, memory 66, a communications interface 68 and input/output (I/O) controls 70. In a preferred embodiment, master control unit 64 is a microprocessor (not shown). Memory 66 may include long-term memory and volatile memory components. In addition, software and databases may be located in memory 66. Communications interface 68 is preferably adapted to receive and/or transmit information to a remote location via light, remote control, air pulses, acoustic or radio frequency waves, etc. In a preferred embodiment, communications interface 68 is an antenna (not shown). I/O controls 70 preferably include actuators for motor control and navigation. Robot 10 may also include tools (not shown) such as repair and servicing tools, hardness testing tools, sample collection tools, etc. I/O controls 70 preferably include actuators for motor control and navigation.

Figure 6:
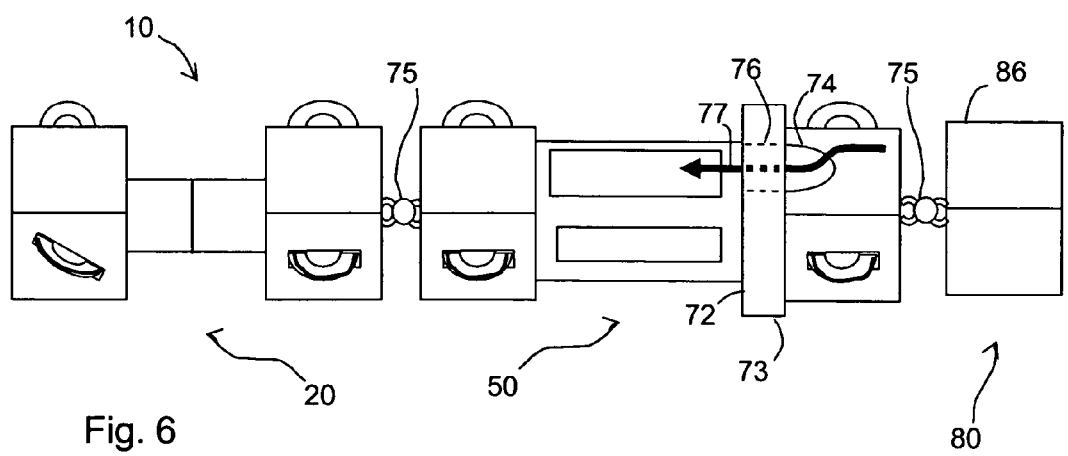
FIG. 6 is a schematic side view of a pipe-crawling robot in accordance with an alternate embodiment of the present invention.

Referring now to FIG. 6, in some preferred embodiments, the robot 10 may include one or more sensors 72 position on one or more of the segments. Sensors 72 may be any desired sensor type, including but not limited to Hall effect sensors, ultrasonic sensors, acoustic sensors, visual and optical inspection sensors, radiographic sensors, magnetic particle sensors, magnetic field sensors, electrical and eddy current sensors, penetrant sensors, pressure sensors, chemical sensors, leak sensors, microwave sensors, pressure and flow sensors, and thermal sensors, etc. Sensors 72 transmit signals to control unit 64 and/or to memory unit 66.

If one or more sensors 72 is of a type such that it is desirable or necessary for the outer surface of the sensor to contact or be proximal to the inside surface of the pipe, the cross-sectional area of the annulus formed between the sensor and the pipe may be inadequate to allow sufficient fluid flow past the robot. In such instances, or in other instances when desired features of the robot tend to obstruct or reduce the remaining cross-sectional area that is available for fluid flow, it may also be necessary to provide channels or passages in the components of the robot, through which the air or other fluid flowing in the pipe may pass. An example of such a channel is illustrated in FIG. 6, in which a sensor 72 includes a passageway 76 (shown in phantom) and the adjacent end section includes a notch 74. Notch 74 and passageway 76 are preferably substantially aligned so as to allow a relatively smooth flow of fluid 77 along the length of the tool, even if the outer surface of sensor 72 contacts or nearly contacts the inside of the pipe. Other passageways or channels may be included in any of the components of robot 10 as necessary, and any section or sections of the robot may be provided with fluid flow passages.

Referring again to FIG. 4, in integrated circuit 58, master control unit 64 communicates with memory 66 to access information from I/O controls 70 and/or sensors 72 and store the information in memory 66. In some embodiments, master control unit 64 communicates with communications interface 68 to access information from I/O controls 70 and then stores the information in memory 66. Master control unit 64 can also send information to I/O controls 70.

Figure 5:
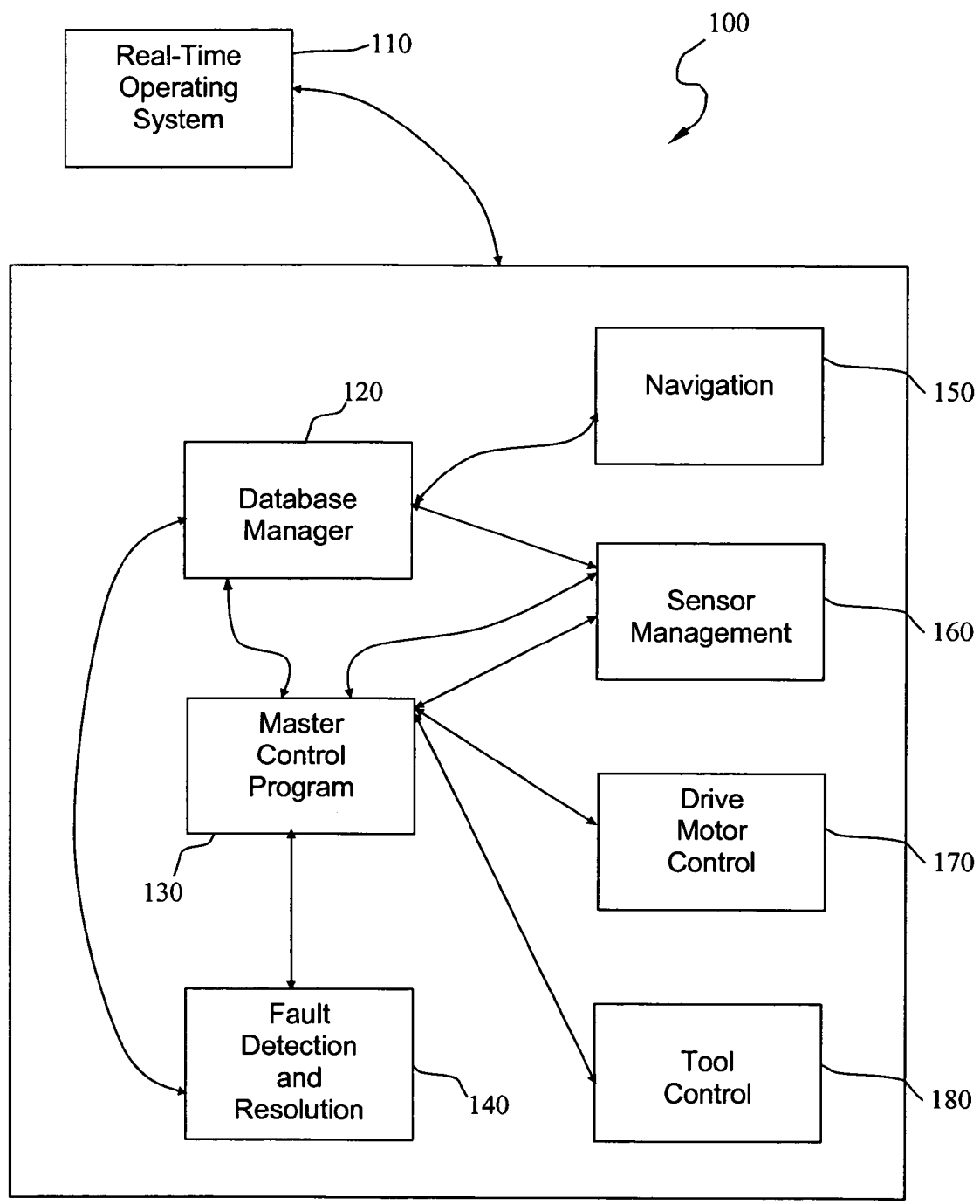
FIG. 5 is a block diagram of software architecture in accordance with an embodiment of the present invention.
Figure 8:
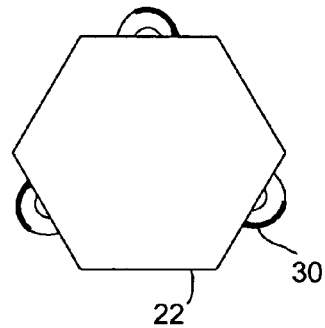
FIGS. 8 and 9 are end and side views of an alternative embodiment of the present invention, respectively.
Figure 9:
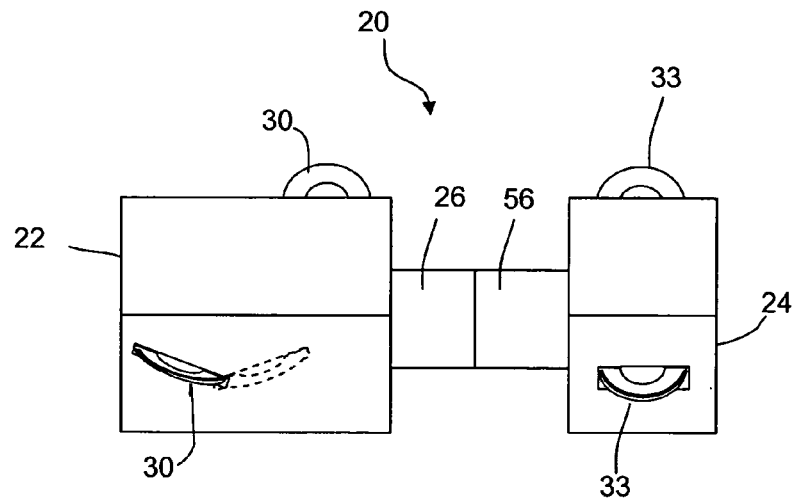
Figure 10:
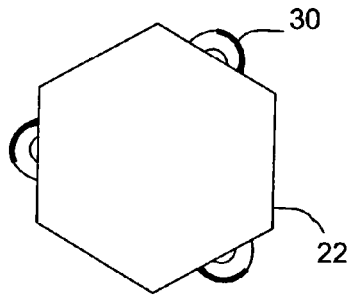
FIGS. 10 and 11 are end and side views of the same embodiment as FIGS. 8 and 9, respectively, with the end section of the device rotated by 30 degrees.
Figure 11:
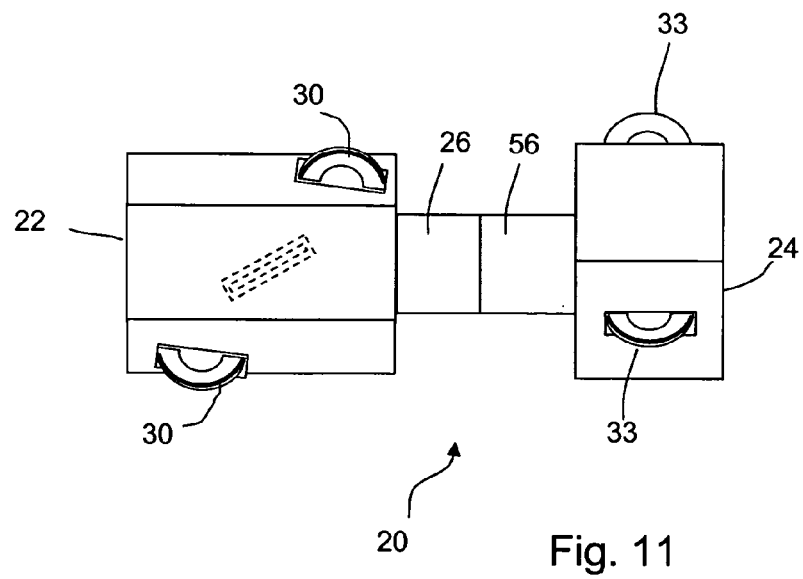

Referring now to FIG. 5, a block diagram of the software architecture 100 for one embodiment of the present invention is shown. The software 100 includes real-time operating system 110, a database manager module 120, a master control program module 130, a fault detection and resolution module 140, a navigation module 150, a sensor management module 160, a drive motor control module 170, and a tool control module 180. Real-time operating system 110 creates the environment for the rest of the modules to operate.

Database manager module 120 maintains and organizes the information or data in a database. Database manager module 120 may communicate with at least navigation module 150, sensor management module 160, master control program module 130, and fault detection and resolution module 140. In a preferred embodiment, database manager module 120 receives and stores time-tagged information from navigation module 150 and sensor management module 160. Database manager module 120 is also capable of recording significant events.

Master control program module 130 is the intelligence of robot 10. Master control program module 130 may communicate with at least database manager module 120, sensor management module 160, drive motor control module 170, tool control module 180, and fault detection and resolution module 140. In a preferred embodiment, master control program module 130 schedules sensor and tool commands, which are implemented in sensor management module 160 and tool control module 180, respectively. Master control program 130 also obtains location and sensor information from a database.

Fault detection and resolution module 140 preferably detects when a fault has occurred, whether the fault is software or hardware related, and determines how to correct the fault. Fault detection and resolution module 140 may communicate with master control program module 130 and database manager module 120. In a preferred embodiment, fault detection and resolution module 140 tests for locomotion failures and disengages wheels 30 and/or wheels 33 as necessary. As discussed above, when wheels 30 on drive segment 20 are disengaged, for example, robot 10 reverts to a passive device propelled through the conduit by flowing gas or liquid. Fault detection and resolution module 140 may also test for and correct sensor, navigation, and tool failures. Navigation module 150 preferably records the position of a wheel-mounted optical encoder 31, time-tags the information, and stores in it a database. Navigation module 150 communicates with database manager module 120. In other embodiments, the position of the tool in the pipe may be determined using one or more optical encoders. Using any suitable technology, the optical encoders can be used to sense distance traveled. In a preferred embodiment, at least two and more preferably at least three optical encoders are included on robot 10. The data or signals from each encoder are collected and processed so as to give a more accurate calculation of the tool's position. data fusion techniques and/or signal redundancy techniques. These or other algorithms are used to better estimate the position of the tool.

Sensor management module 160 collects information from and controls various sensors. Sensor management module 160 communicates with database manager module 120 and master control program module 130. In a preferred embodiment, sensor management module 160 performs real-time information processing and stores reduced, time-tagged information in a database.

Drive motor control module 170 preferably controls electric motor 62. Drive motor control module 170 communicates with master control program module 130. Drive motor control module 170 preferably receives and responds to commands from master control program module 130. In a preferred embodiment, drive motor control module 170 sends information to electric motor 62 in the form of pulse-width modulated signals.

Tool control module 180 preferably controls various tools. Tool control module 180 communicates with master control program module 130 and preferably receives and responds to commands from master control program module 130. In a preferred embodiment, tool control module 180 generates tool-specific command signals.

Pipe-crawling robot 10 preferably also includes a power system. Referring now to FIG. 6, an alternative embodiment of the robot includes a third segment 80. Segment 80 preferably includes a power supply, and is preferably an electric power module. In a preferred embodiment, power provided by segment 80 continuously or intermittently charges battery 59 on segment 50. Second segment 50 is preferably connected to third segment 80 by a second flexible coupling 75.

Similar to flexible coupling 75, flexible coupling 105 is free to bend about the longitudinal axis of robot 10, but prevents the relative rotation about the longitudinal axis. Flexible couplings 75, 105 are preferably capable of detaching from segments 20, 50, and 80. Also, additional flexible couplings (not shown) may be attached to segments 20, 50, and 80. The use of flexible couplings allows robot 10 to reduce or increase its number of segments, which may be useful for unloading payloads, recovering payloads, etc., in a conduit.

Figure 7:
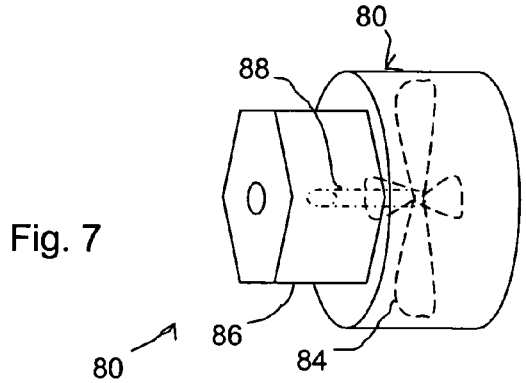
FIG. 7 is a schematic perspective view of one portion of the third segment of the robot shown in FIG. 6.

Referring now to FIG. 7, a more detailed depiction of third segment 80 is shown. In a preferred embodiment, third segment 80 includes a turbine-based power supply system 82. Turbine system 82 preferably includes a turbine or fan 84 (shown in phantom), a motor/generator 86, and a shaft 88 (shown in phantom) disposed between fan 84 and motor/generator 86. For purposes of the present invention, any mechanical device capable of extracting mechanical energy from a fluid flow, include one or more turbines, fans, paddles, and the like, can be used in turbine system 82. For ease of reference, the term "fan 84" will be used to refer to all such devices. Turbine system 82 is preferably driven by air blown through the conduit (not shown), but may alternatively be powered by any fluid flow. Mechanical power extracted from the fluid flow as it spins the turbine is converted into electrical power by generator 86. This power can be transmitted directly to motor 56 (FIG. 1) so as to propel the robot, or it can be stored in battery 59, or any combination of these. For example, the control system may sense when battery power is low and direct power to the battery in order to recharge it. An advantage of turbine system 82 is that it permits a virtually unlimited supply of electrical power without a practical limit on the distance robot 10 may travel in a conduit.

In an alternate embodiment, third segment 80 includes a battery system (not shown). In yet another alternate embodiment, third segment 80 includes a power tether (not shown). Battery systems and power tethers are desirable for use in applications of limited distance and involving relatively straight conduits.

Operation of Power System

When it is desired to use the present robot to measure, assess, or survey a length of conduit (pipe), robot 10 is placed in the conduit and compressed air or inert gas is caused to flow through the conduit. This may be accomplished by the use of an air compressor or bottled compressed gas. The flowing gas turns the blades of fan 84, which spin turbine shaft 88. Turbine shaft 88 connects to electric generator 86, which produces electricity (electric current). As discussed above, the electrical current is preferably used to charge an onboard battery 59, which in turn provides power to drive the wheels 30. Electric generator 86 also preferably provides power as needed to integrated circuit 58, sensors 72, and electric motor 62.

Operation of Drive and Driver Segments

When instructed to turn on, shaft 26 of electric motor 56 causes end section 22 of first segment 20 to rotate about the longitudinal axis. This is accomplished because the longitudinally aligned wheels in end section 24 and second segment 50 resist the tendency of end section 24 and second segment 50 to rotate, thus the motor 56 torque causes end section 22 of first segment 20 to rotate.

For example, if shaft 26 and end section 22 are rotating in the clockwise direction (as viewed from the device), robot 10 is pulled in the forward direction. This is because the inclined wheels 30 on first segment 20 have the effect of screw threads, and thus the rotational motion of first segment 20 is transformed into longitudinal motion of robot 10.

In order to reverse the direction of travel, shaft 26 of motor 56 is instructed to rotate in the opposite direction, i.e. counterclockwise. This causes end section 22 to rotate counterclockwise, and subsequently push robot 10 in the reverse direction.

In some embodiments, the speed at which shaft 26 rotates can be adjusted by motor 56, causing robot 10 to accelerate or decelerate. When it is desirable for robot 10 to stop, motor 56 ceases movement of shaft 26.

As stated above, in a preferred embodiment, the suspension system that supports each wheel is preferably a spring-loaded cartridge. Each spring-loaded cartridge includes a spring-loaded piston to which the wheels 30 are mounted. The spring-loaded piston 37 urges the wheel 30 outwardly so that the wheel can engage the conduit wall (not shown), which in turn induces sufficient friction to prevent slipping. When the suspension systems are cam-driven cartridges, the rotation of the cam induces a normal force between the wheel 30 and the conduit wall (not shown), again inducing sufficient friction to prevent slipping.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

For example, while the present invention has been described having two or three separate modules or segments, it will be appreciated that any number of modules may be used. Likewise, the order and positioning of the segments in the device may be varied. Connected components may be connected either directly or indirectly. The use of additional modules may serve to house additional sensor or power equipment or carry various payloads. In some embodiments, the additional modules may be specialized for specific sensors. Furthermore, where the amount of data to be stored is excessive, it may be desirable to include multiple memory modules. Similarly, the position, numbering and configuration of pitched and non-pitched wheels can be varied without altering the basic operation of the device.

What is claimed is:

1. An autonomous robot for traversing a conduit comprising:
   a first section having a plurality of pitched wheels, said pitched wheels being oriented such that each of their axes defines a pitch angle greater than zero degrees and less than ninety degrees with respect to the longitudinal axis of the conduit each of said pitched wheels being positioned at a different point along the length of the robot such that no two pitched wheels are at the same point along the length of the robot;
   a second section rotatably connected to said first section, said second section having a plurality of wheels aligned parallel to the longitudinal axis of the conduit; and
   means for causing rotation of one of said first and second sections relative to the other of said first and second sections;
   wherein said relative rotation of said first and second sections provides locomotive motion of the robot.

2. The robot according to claim 1 wherein each of said pitched wheels is positioned at a different azimuthal position about the axis of the robot.

3. The robot according to claim 1 wherein at least two of said pitched wheels are positioned at the same azimuthal position about the axis of the robot.

4. The robot according to claim 1 wherein said pitched wheels define at least one helical row.

5. The robot according to claim 4 wherein adjacent pitched wheels are spaced 180 degrees apart about the axis of the robot.

6. The robot according to claim 1 wherein said wheels have notched traction surfaces.

7. The robot according to claim 1 wherein at least one component of the robot has an outer diameter that substantially corresponds to the inside surface of the conduit and the robot includes at least one internal passageway that allows fluid to flow along the length of the robot without having to pass between said at least one component and the inside surface of the conduit.

8. The robot according to claim 1, further comprising at least two optical encoders.

9. The robot according to claim 1 wherein the robot is no more than six inches in diameter.

10. An autonomous robot for traversing a conduit comprising:
    a first section having a plurality of pitched wheels, said pitched wheels being oriented such that each of their axes defines a pitch angle greater than zero degrees and less than ninety degrees with respect to the longitudinal axis of the conduit;
    a second section rotatably connected to said first section, said second section having a plurality of wheels aligned parallel to the longitudinal axis of the conduit; and
    means for causing rotation of one of said first and second sections relative to the other of said first and second sections;
    wherein said relative rotation of said first and second sections provides locomotive motion of the robot; and
    wherein at least one wheel is moveable between a first position in which all of said wheels on the same section contact said conduit and a second position in which at least one of said of said wheels is retracted.

11. The robot according to claim 10 wherein the retraction distance of said at least one wheel is equal to at least one-third the diameter of the wheel.

12. The robot according to claim 11 wherein the retraction distance of said at least one wheel is equal to at least one-half the diameter of the wheel.

13. The robot according to claim 11 wherein the retraction distance of said at least one wheel is such that the diameter of the robot is decreased by at least 20 percent upon wheel retraction.

14. An autonomous robot for traversing a conduit comprising:
    a body; and
    a drive system capable of extracting energy from a flow of fluid through the conduit and using the energy to advance the body along the inside of the conduit, said drive system including at least one set of pitched wheels mounted on said body, each of said pitched wheels being positioned at a different point along the length of the robot such that no two pitched wheels in said set are at the same point along the length of the robot;
    wherein at least one component of the robot has an outer diameter that substantially corresponds to the inside surface of the conduit and the robot includes at least one internal passageway that allows fluid to flow along the length of the robot without having to pass between said at least one component and the inside surface of the conduit.

15. The robot according to claim 14 wherein said drive system includes a plurality of pitched wheels that are each positioned at a different point along the length of the robot.

16. The robot accoiding to claim 15 wherein said pitched wheels are each positioned at a different point about the axis of the robot.

17. The robot according to claim 15 wherein said pitched wheels define at least one helical row.

18. The robot according to claim 17 wherein adjacent pitched wheels are spaced 180 degrees apart about the axis of the robot.

19. The robot according to claim 18 wherein the robot is no more than six inches in diameter.

20. The robot according to claim 14 wherein said wheels have notched traction surfaces.

21. The robot according to claim 14, further comprising at least two optical encoders.

22. An autonomous robot for traversing a conduit comprising:
    a body; and
    a drive system capable of extracting energy from a flow of fluid through the conduit and using the energy to advance the body along the inside of the conduit, said drive system including at least one set of pitched wheels mounted on said body;
    wherein at least one component of the robot has an outer diameter that substantially corresponds to the inside surface of the conduit and the robot includes at least one internal passageway that allows fluid to flow along the length of the robot without having to pass between said at least one component and the inside surface of the conduit; and wherein at least one wheel is moveable between a first position in which all of said wheels on the same section contact said conduit and a second position in which at least one of said of said wheels is retracted.

23. The robot according to claim 22 wherein the retraction distance of said at least one wheel is equal to at least one-third the diameter of the wheel.

24. The robot according to claim 23 wherein the retraction distance of said at least one wheel is equal to at least one-half the diameter of the wheel.

25. The robot according to claim 24 wherein the retraction distance of said at least one wheel is such that the diameter of the robot is decreased by at least 20 percent upon wheel retraction.

* * * * *